(12) United States Patent
Srinivasan et al.

(10) Patent No.: US 9,838,330 B2
(45) Date of Patent: *Dec. 5, 2017

(54) SYSTEM AND METHOD FOR SUPPORTING CREDIT MANAGEMENT FOR OUTPUT PORTS IN A NETWORKING DEVICE

(71) Applicant: Oracle International Corporation, Redwood Shores, CA (US)

(72) Inventors: Arvind Srinivasan, San Jose, CA (US); Carlos Castil, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,824

(22) Filed: Dec. 29, 2014

(65) Prior Publication Data

US 2016/0191404 A1 Jun. 30, 2016

(51) Int. Cl.
*H04L 12/935* (2013.01)
*H04L 12/801* (2013.01)
*H04L 12/873* (2013.01)
*H04L 12/933* (2013.01)

(52) U.S. Cl.
CPC ........ *H04L 47/527* (2013.01); *H04L 49/3027* (2013.01); *H04L 47/39* (2013.01); *H04L 49/101* (2013.01); *H04L 49/3045* (2013.01)

(58) Field of Classification Search
CPC .............................. H04L 49/205; H04L 49/90
See application file for complete search history.

(56) References Cited

U.S. PATENT DOCUMENTS

| 6,611,527 B1 | 8/2003 | Moriwaki |
| 6,789,118 B1 * | 9/2004 | Rao ........................ H04L 45/10 370/230 |
| 7,058,053 B1 | 6/2006 | Schober |
| 7,194,661 B1 | 3/2007 | Payson |

(Continued)

FOREIGN PATENT DOCUMENTS

| EP | 1117213 | 7/2001 |
| EP | 2134037 | 12/2009 |

OTHER PUBLICATIONS

European Patent Office, International Searching Authority, International Search Report and Written Opinion for International Patent Application No. PCT/US2015/063521, 18 pages.

(Continued)

*Primary Examiner* — Ayaz Sheikh
*Assistant Examiner* — Debebe Asefa
(74) *Attorney, Agent, or Firm* — Tucker Ellis LLP

(57) ABSTRACT

A system and method can support efficient packet switching in a network environment. A networking device, such as a network switch, which includes a crossbar fabric, can be associated with a plurality of input ports and a plurality of output ports. Furthermore, the networking device operates to detect a link state change at an output port on the networking device. The output port can provide one or more credits to an output scheduler, and the output scheduler allows one or more packets targeting the output port to be dequeued from one or more virtual output queues, based on the one or more credits.

20 Claims, 8 Drawing Sheets

(56) References Cited

U.S. PATENT DOCUMENTS

| | | | |
|---|---|---|---|
| 7,295,563 B2 | 11/2007 | Hughes | |
| 7,391,786 B1 | 6/2008 | Prasad | |
| 7,729,247 B2 | 6/2010 | Kim | |
| 7,792,098 B2 | 9/2010 | Garmire | |
| 7,830,793 B2 | 11/2010 | Gai | |
| 8,391,302 B1 | 3/2013 | Kommidi | |
| 9,262,356 B2 * | 2/2016 | Sonntag | G06F 13/362 |
| 9,294,402 B2 | 3/2016 | Yamaguchi | |
| 2003/0223416 A1 | 12/2003 | Rojas | |
| 2005/0036502 A1 | 2/2005 | Blanc | |
| 2005/0076166 A1 | 4/2005 | Shearer | |
| 2005/0088969 A1 | 4/2005 | Carlsen | |
| 2005/0226146 A1 | 10/2005 | Rider | |
| 2006/0098681 A1 | 5/2006 | Cafiero | |
| 2008/0291825 A1 | 11/2008 | Kendall | |
| 2013/0064068 A1 * | 3/2013 | Kamath | H04L 41/0668 370/222 |
| 2014/0120771 A1 * | 5/2014 | Tai | 439/607.38 |
| 2014/0173163 A1 | 6/2014 | Kitahara | |

OTHER PUBLICATIONS

U.S., Office Action dated Jul. 27, 2016 for U.S. Appl. No. 14/584,816, 15 Pages.

European Patent Office, International Searching Authority, International Search Report and Written Opinion dated Mar. 21, 2016 for International Patent No. PCT/US2015/063520, 12 pages.

U.S., Office Action dated Apr. 8, 2016 for U.S. Appl. No. 14/584,847, 10 pages.

European Patent Office, International Searching Authority, Communication Relating to the Results of the Partial International Search, Annex to Form PCT/ISA/206 dated Mar. 14, 2016 for International Patent Application No. PCT/US2015/063521, 4 pages.

* cited by examiner

SYSTEM AND METHOD FOR SUPPORTING CREDIT MANAGEMENT FOR OUTPUT PORTS IN A NETWORKING DEVICE

CROSS REFERENCE TO RELATED APPLICATIONS

This application is related to the following patent applications, each of which is hereby incorporated by reference in its entirety:

U.S. patent application Ser. No. 14/584,816, filed Dec. 29, 2014, entitled "SYSTEM AND METHOD FOR SUPPORTING EFFICIENT VIRTUAL OUTPUT QUEUE (VOQ) RESOURCE UTILIZATION IN A NETWORKING DEVICE";

U.S. patent application Ser. No. 14/584,831, filed Dec. 29, 2014, entitled "SYSTEM AND METHOD FOR SUPPORTING EFFICIENT VIRTUAL OUTPUT QUEUE (VOQ) PACKET FLUSHING SCHEME IN A NETWORKING DEVICE"; and U.S. patent application Ser. No. 14/584,847, filed Dec. 29, 2014, entitled "SYSTEM AND METHOD FOR SUPPORTING BUFFER REALLOCATION IN A NETWORKING DEVICE".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a high performance system in a cloud environment.

BACKGROUND

As larger cloud computing architectures are introduced, the performance and administrative bottlenecks associated with the traditional network and storage have become a significant problem. A high performance system can provide excellent processing speeds, significantly faster deployments, instant visuals for in-depth analysis, and manageable big data capability. This is the general area that embodiments of the invention are intended to address.

SUMMARY

Described herein are systems and methods that can support efficient packet switching in a network environment. A networking device, such as a network switch, which includes a crossbar fabric, can be associated with a plurality of input ports and a plurality of output ports. Furthermore, the networking device operates to detect a link state change at an output port on the networking device. The output port can provide one or more credits to an output scheduler, and the output scheduler allows one or more packets targeting the output port to be dequeued from one or more virtual output queues, based on the one or more credits.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network switch as an example for a high performance networking device. It will be apparent to those skilled in the art that other types of high performance networking devices can be used without limitation.

Described herein are systems and methods that can support packet switching in a network environment, such as a cloud environment.

High Performance System

Figure 1:
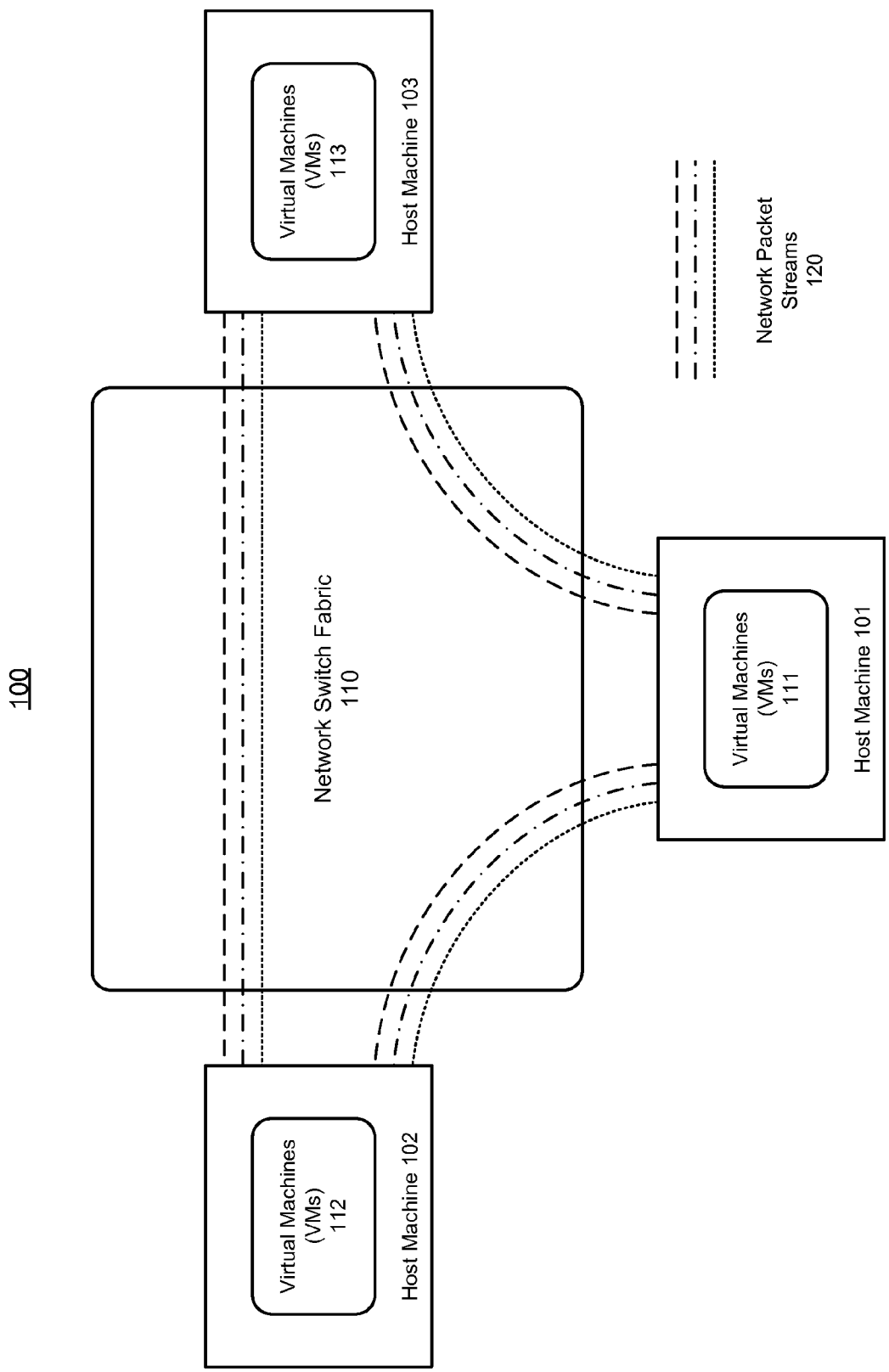
FIG. 1 shows an illustration of supporting a high performance system in a network environment, in accordance with an embodiment of the invention.

FIG. 1 shows an illustration of supporting a high performance system in a network environment, in accordance with an embodiment of the invention. As shown in FIG. 1, a high performance system 100 can include a plurality of host machines 101-103 (or servers) that are interconnected via a network switch fabric 110.

The network switch fabric 110 in the high performance system 100 can be responsible for directing the traffic movement between various virtual machines (VMs) 111-113 (and/or virtualized applications) that are running on the various host machines 101-103.

In accordance with an embodiment of the invention, the network switch fabric 110 can be based on the InfiniBand (IB) protocol, which can manage the peer-to-peer credit exchanges and provides lossless end-to-end connectivity. Thus, various networking devices in the network switch fabric 110 can maintain credit consistency under different conditions for supporting the data transfer in the high performance system 100.

Additionally, each physical IB link can be divided into multiple virtual link (VLs) in order to provide quality of service (QoS) for traffic between various VMs 111-113 (and/or applications). For example, the network packet streams 120 between the host machines 101-103 can represent an aggregation of different services that the different VMs 111-113 and applications may desire. Furthermore, the individual packet streams 120, which are transmitted within the aggregated network pipes between the different source and destination pairs, can meet different service requirements (or even conflicting service requirements).

InfiniBand (IB) Network Switch

Figure 2:
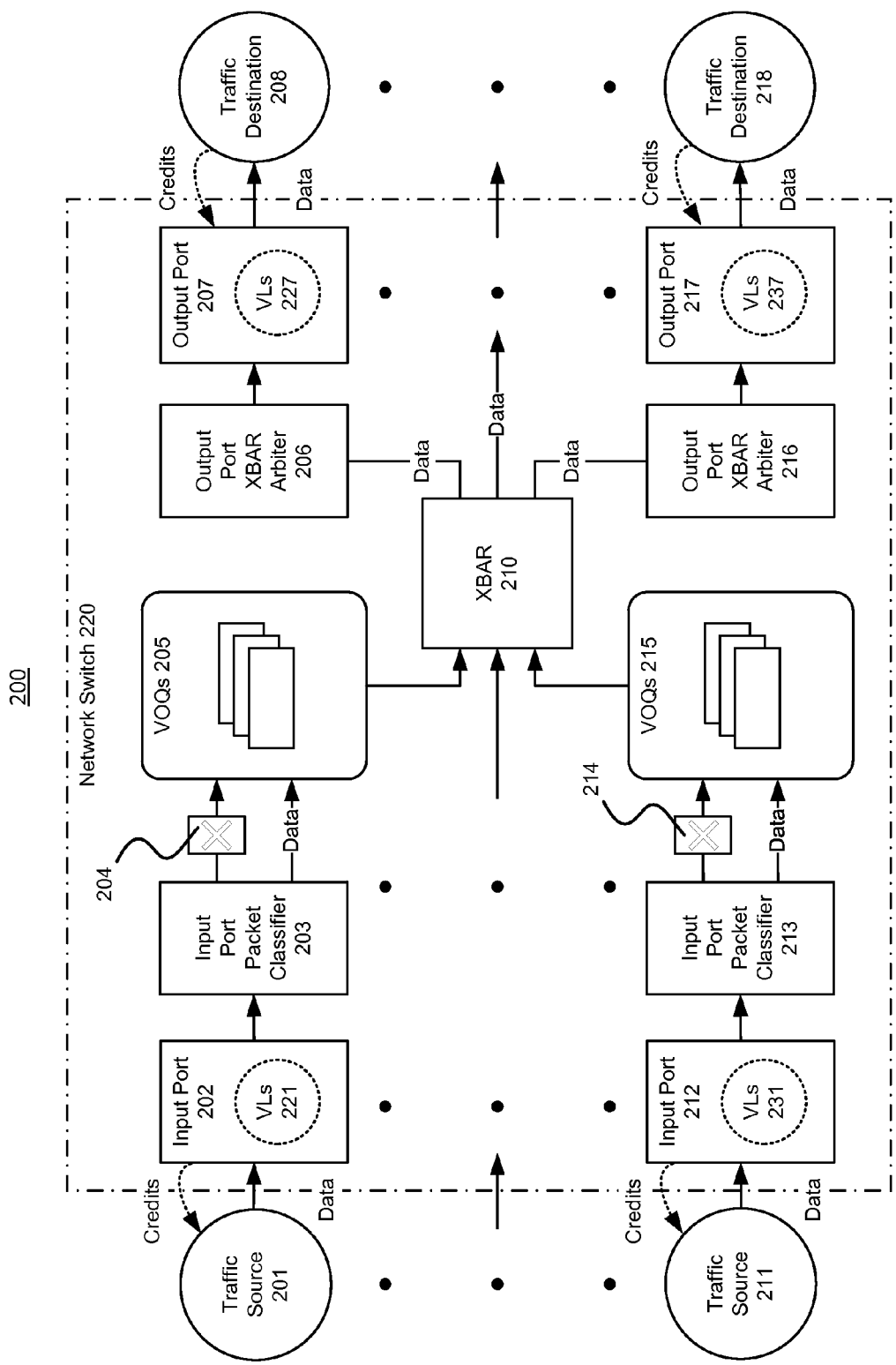
FIG. 2 shows an illustration of supporting a network switch in a high performance system, in accordance with an embodiment of the invention.

FIG. 2 shows an illustration of supporting a network switch in a high performance system, in accordance with an embodiment of the invention. As shown in FIG. 2, a network device, such as an IB network switch 220 in a high performance system 200, can be responsible for directing data traffic from various traffic sources 201 and 211 to various traffic destinations 208 and 218.

For example, the IB network switch 220, which supports a large number of ports, such as the input ports 202 and 212 and the output ports 207 and 217, can be based on a crossbar (XBAR) fabric 210.

As shown in FIG. 2, the input port 202 can receive various incoming data packets from the traffic source 201 using the source VLs 221, and the input port 212 can receive various data packets from the traffic source 211 using the source VLs 231. Also, the output port 207 can send outgoing data packets to the traffic destination 208 using the destination VLs 227, and the output port 217 can send outgoing data packets to the traffic destination 218 using the destination VLs 237.

Furthermore, the IB switch 220 can meet the different QoS demands, which supports the optimal usages of available network fabric resources. For example, the IB switch 220 may re-map an incoming VL for a packet (i.e. a source VL) to a different outgoing VL for the packet (i.e. a destination VL), based on the service levels (SL) of the traffic that is associated with an application.

In accordance with an embodiment of the invention, each of the input ports 202 or 212 can take advantage of an input port packet classifier 203 or 213, which can determine an output port for each incoming packet. For example, the input port packet classifiers 203 can determine an output port for each packet received at the input port 202 (and can use a port filter 204 to remove one or more packets), and the input port packet classifiers 213 can determine an output port for each packet received at the input port 212 (and can use a port filter 214 to remove one or more packets).

Additionally, the input port classifier 203 or 213 can determine multiple output destination ports for each multi-destination packet (such as for multicasting and broadcasting) that arrive at the input ports 202 or 212. The port filter 204 can remove one or more destination ports from the port list for the given packet. Furthermore, a multi-destination packet may be dropped if all the destination ports are removed from the list. Otherwise, the packet can be queued for the available destination ports, which can be a subset of the originally classified port list (by the input port packet classifier).

On per input port basis, the input port 202 or 212 can store the received packets in an ingress buffer, e.g. the virtual output queues (VOQs) 205 or 215, before transmitting the received packets to a traffic destination 208 or 218 (e.g. via an output port 207 or 217). As shown in FIG. 2, the packets received at the input port 202 can be stored in the VOQs 205 and the packets received at the input port 212 can be stored in the VOQs 215.

Additionally, each of the ingress buffers (e.g. the VOQs 205 or 215) may include a number of queues, each of which can be responsible for handling packets targeting a destination VL associated with an output port (e.g. the VLs 227 on the output port 207 and the VLs 237 on the output port 217). Thus, the total number of the queues on per input port basis can be the product of the number of the output ports and the number of the destination VLs supported on each output port. As a result, the system may require a large number of queues for each input port 202 or 212, if the number of ports and the number of VLs supported on each port are large.

In accordance with an embodiment of the invention, the VOQs 205 and 215 can be implemented using a shared memory structure, and the utilization of each queue in the VOQs 205 and 215 can be traffic dependent. For example, a VOQ resource can represent the number of the memory blocks, which are consumed when an incoming packet is queued (i.e. the receipt of a network packet) and eventually freed up when the packet is dequeued (i.e. the delivery of the packet to an output port). Thus, the utilization of the VOQ resource can be a function of the traffic patterns.

In accordance with an embodiment of the invention, the system can schedule the input ports 202 and 212 and direct the movement of the packets stored in the VOQs 205 and 215 toward the output ports 207 and 217. The drain rate of each queue in the ingress buffer may depend on the destination VLs and the output ports that the packets target.

As shown in FIG. 2, each output port 207 or 217 can take advantage of an output scheduler (such as an output port XBAR arbiter 206 or 216). The output port XBAR arbiter 206 or 216 can make decision that are relate to the packet movement based on various criteria, such as the fullness of various VOQs and the available credits on the destination VLs.

In accordance with an embodiment of the invention, the IB network switch 220 can maintain credit consistency under different conditions. As shown in FIG. 2, on the receive side of the IB network switch 220, the credits can be maintained consistent based on the incoming source VLs 221 and 231 of the incoming packets; and on the transmit side of the IB network switch 220, the credits can be maintained consistent based on the destination VLs 227 and 237 of the outgoing packets.

Furthermore, on per input port basis, the queuing of each incoming packet can be performed based on the source VL of the packet. Thus, the system can perform various credit accounting operations based on the source VLs 221 or 231. For example, for the purpose of credit accounting, a VOQ set can be assigned to each source VL in the IB network switch 220.

Link State Change in a Network Switch

Figure 3:
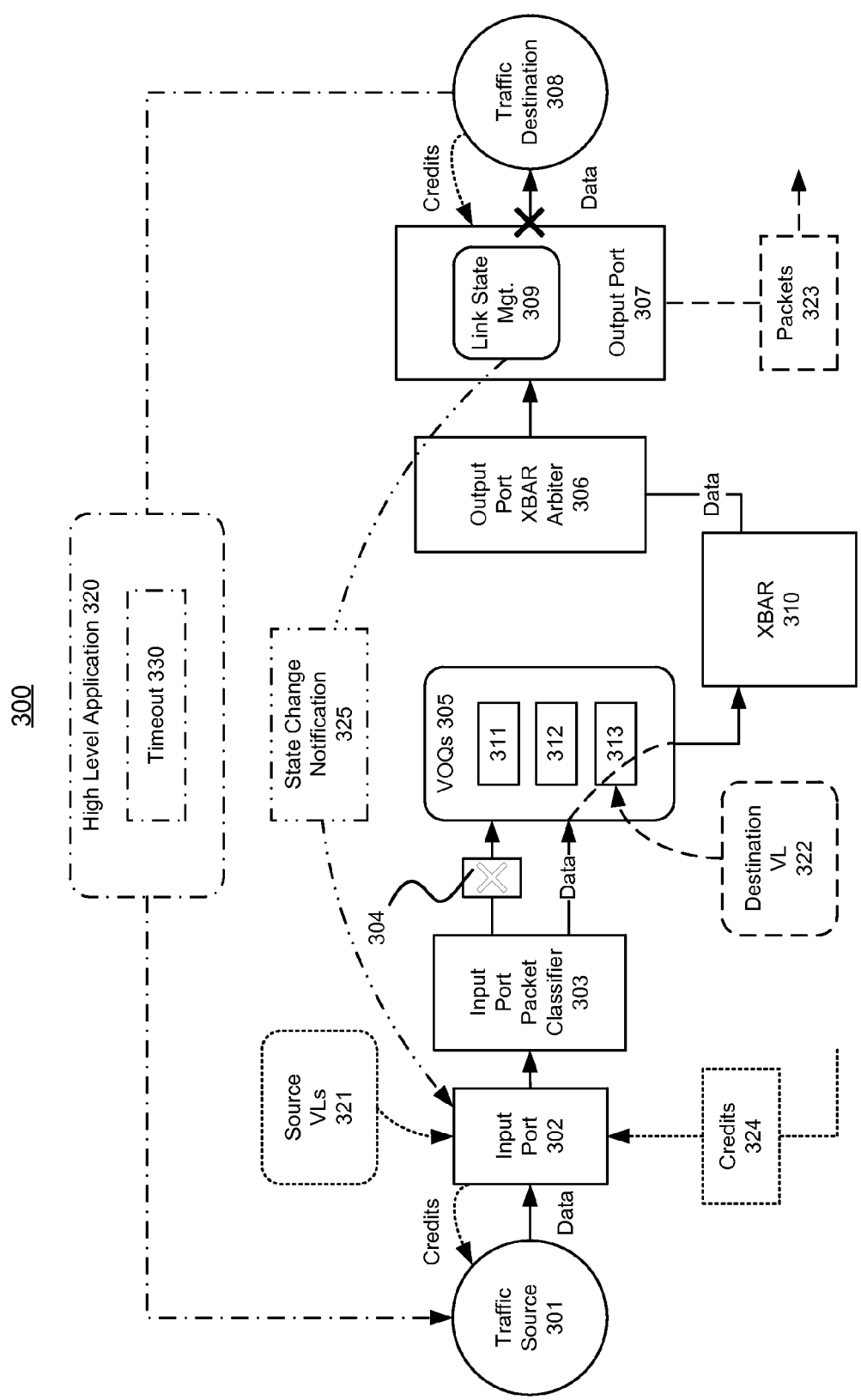
FIG. 3 shows an illustration of handling a link state change in a network environment, in accordance with an embodiment of the invention.

FIG. 3 shows an illustration of handling a link state change in a network environment, in accordance with an embodiment of the invention. As shown in FIG. 3, in a high performance system 300, a data flow in an IB network switch can involve an input port 302 and an output port 307, via a crossbar (XBAR) fabric 310.

The input port 302 can advertise one or more credits to and receives one or more data packets from a remote sender, such as the traffic source 301. The output port 307 can send one or more data packets to and receives one or more credits back from a remote receiver, such as the traffic destination 308.

Furthermore, the input port 302 can take advantage of an input packet classifier 303, which can determine one or more destinations for each incoming packet (and can use a port filter 304 to remove one or more packets). Additionally, the input port 302 can store the received packets in an ingress buffer, such as the virtual output queues (VOQs) 305, before forwarding the packets to the different output ports.

As shown in FIG. 3, the VOQs 305 can include a plurality of queues 311-313, each of which can store packets targeting a different destination VL on the output ports. For example, the queue 313 can be responsible for storing packets targeting destination VL 322 on the output port 307.

In accordance with an embodiment of the invention, the traffic source 301 may not know whether the traffic destination 308 is reachable at the time when the traffic source 301 sends the packets. Thus, when the output port 307 goes down, the traffic source 301 may continually send more packets, which can result in the unnecessary high (or even wasteful) utilization of the VOQ resources for the packets that may eventually be dropped.

For example, when the output port 307 is down, the output port 307 can drain the packets 323 that arrive. As the packets 323 are drained, the credits 324, which are released, can be returned to the source VLs 321 on the input port 302. Since the traffic source 301 may not be aware that the output port 307 goes down, the traffic source 301 may continually send more packets to the input port 302 as long as enough credits are available, even though these packets may eventually be drained out at the output port 307.

Moreover, other output ports, which are part of the same VOQ structure, may not be able to utilize the VOQ resources, since the VOQ resources associated with the source VLs 321 may continually be consumed by the packets that are eventually dropped at the output port 307.

Furthermore, when the output port 307 goes down, it may take a long period of time for the high level applications 320 to be able to handle the link state changes, since the timeout 330 setting for the high level applications 320 tends to be relatively large. In the meantime, the traffic source 301 may keep on sending packets at a high speed (e.g. 100G per second). Thus, the incoming traffic can easily overwhelm the VOQ resources.

In accordance with an embodiment of the invention, the output port 307 can perform the link state management 309, and notify the input port 302 with regarding to the link state changes. For example, the output port 307, which detects the link state change, can broadcast the state change notification 325 across all VOQs (e.g. VOQs 305), e.g. via an output port arbiter 306. Eventually, the state change notification 325 may reach the input port 302 (and various other input ports).

As shown in FIG. 3, the input port 302 can prevent the received packets from being presented at the output port 307, which is down. For example, the input packet classifier 303 can configure and/or use a mask (e.g. an output port filter mask based on the broadcast signal) as a final check before queuing the received packets into the VOQs 305.

Additionally, the input port 302 may drop the packets targeting the output port 307, before they are enqueued into the VOQ 305. These packets, which are dropped due to the going down of the output port 307, may not consume any VOQ space. Correspondently, the credits associated with these dropped packets can be returned to the traffic source 301 right away.

Thus, the system can prevent the VOQ resources from being wasted for storing the packets that may eventually be dropped.

Figure 4:
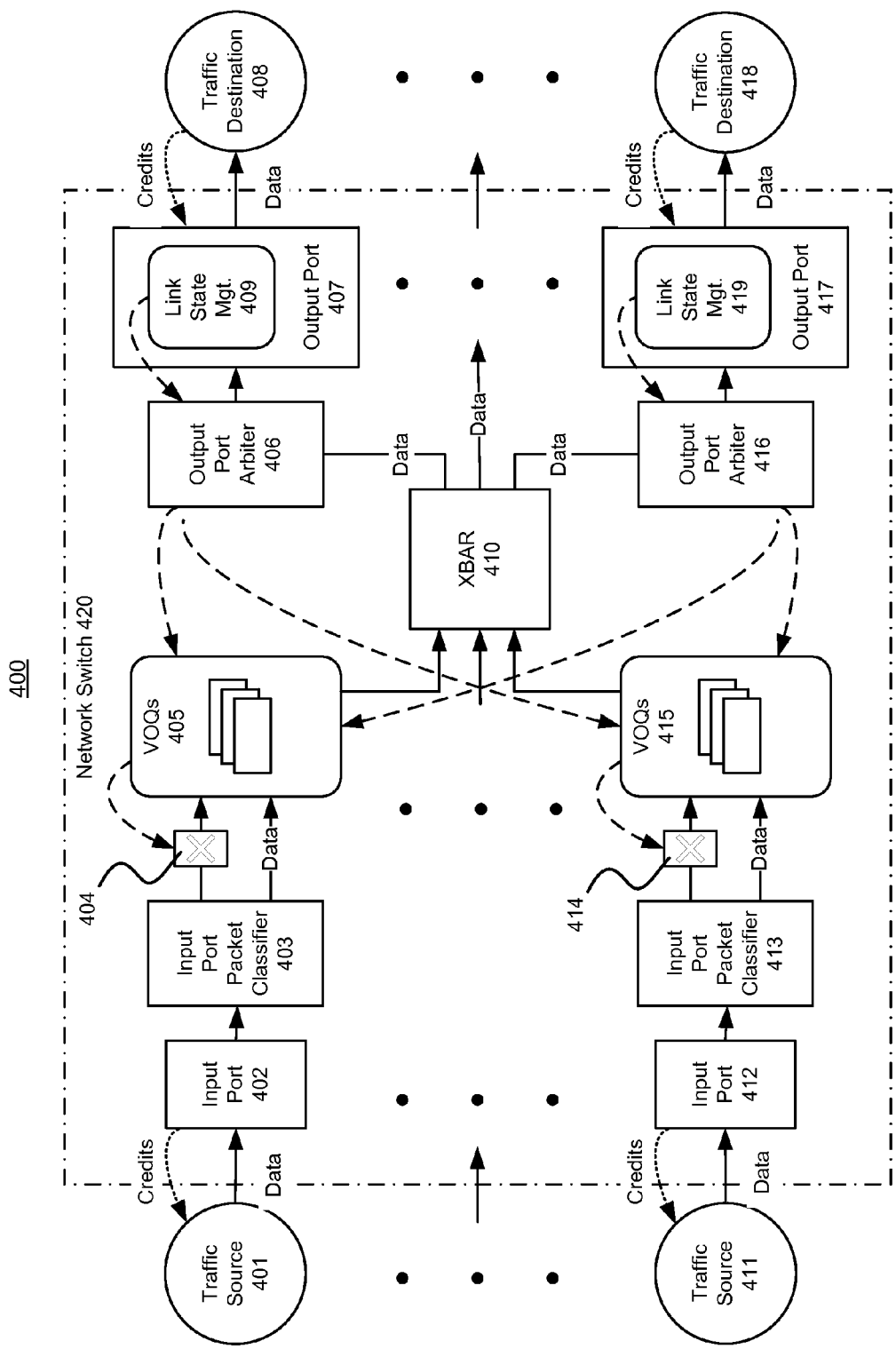
FIG. 4 shows an illustration of managing data flows in a high performance system, in accordance with an embodiment of the invention.

FIG. 4 shows an illustration of managing data flows in a high performance system, in accordance with an embodiment of the invention. As shown in FIG. 4, a network device, such as an IB network switch 420 in a high performance system 400, can be responsible for directing traffic from various remote senders, such as the traffic sources 401 and 411, to various remote receivers, such as the traffic destinations 408 and 418.

Furthermore, the IB network switch 420, which is based on a crossbar (XBAR) fabric 410, can support a large number of ports (with multiple VLs), such as the input ports 402 and 412 and the output ports 407 and 417.

As shown in FIG. 4, each of the input ports 402 or 412 can advertise one or more credits to and receives one or more data packets from the traffic source 401 or 411. Each of the output port 407 or 417 can send one or more data packets to and receives one or more credits back from the traffic destination 408 or 418.

Additionally, each of the input ports 402 and 412 can take advantage of an input port packet classifier 403 or 413, which can determine an output port for each incoming packet. On per input port basis, the packets can be stored in an ingress buffer, e.g. the virtual output queues (VOQs) 405 or 415, before being transmitted to a traffic destination 408 or 418 (via the output port 407 or 417).

In accordance with an embodiment of the invention, the system can manage data flows and VOQ resources when one or more output ports 407 or 417 are going through link state changes (such as link up/down).

As shown in FIG. 4, each output port 407 or 417 can perform the link state management 409 and 419. When an output port 407 or 417 detects any changes in the link state, the output port 407 or 417 can notify an output scheduler, such as an output port arbiter 406 Or 416, which can broadcast the state change notifications, across all VOQs 405 and 415 (eventually to the different input ports 402 and 412).

Furthermore, the input port 402 or 412, which receives the state change notification, can prevent the received packets from being presented at the output port 407 or 417. For example, the input packet classifier 403 or 413 can configure an output port filter mask based on the broadcast signal, and use the mask for the port filter 404 or 414 as a final check before queuing the packets into the VOQs 405 or 415.

Additionally, the input port 402 or 412 can drop the packets targeting the output port 407 or 417 before these packets are queued into the VOQ 405 or 415. These packets, which are dropped due to the link state changes at the output port 407 or 417, may not consume any VOQ space. Correspondently, the credits associated with these packets can be returned right away.

Thus, the high performance system 400 can prevent the VOQ resources from being wasted for storing the packets that may eventually be dropped.

Figure 5:
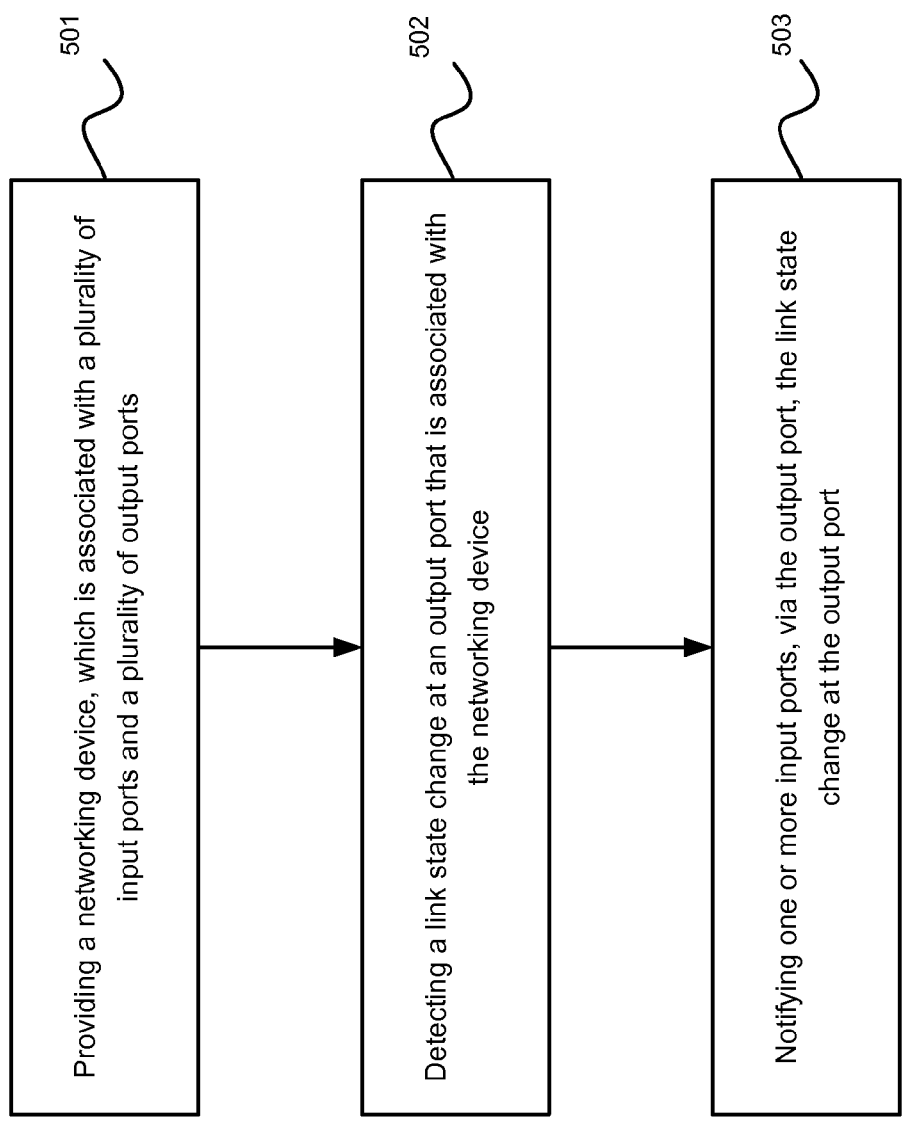
FIG. 5 illustrates an exemplary flow chart for handling a link state change in a network switch, in accordance with an embodiment of the invention.

FIG. 5 illustrates an exemplary flow chart for handling a link state change in a network switch, in accordance with an embodiment of the invention. As shown in FIG. 5, at step 501, the system can provide a networking device, which is associated with a plurality of input ports and a plurality of output ports. Furthermore, at step 502, the system can detect a link state change at an output port that is associated with the networking device. Then, at step 503, the output port can notify one or more input ports of the link state change at the output port.

Credit Management in a Network Switch

Figure 6:
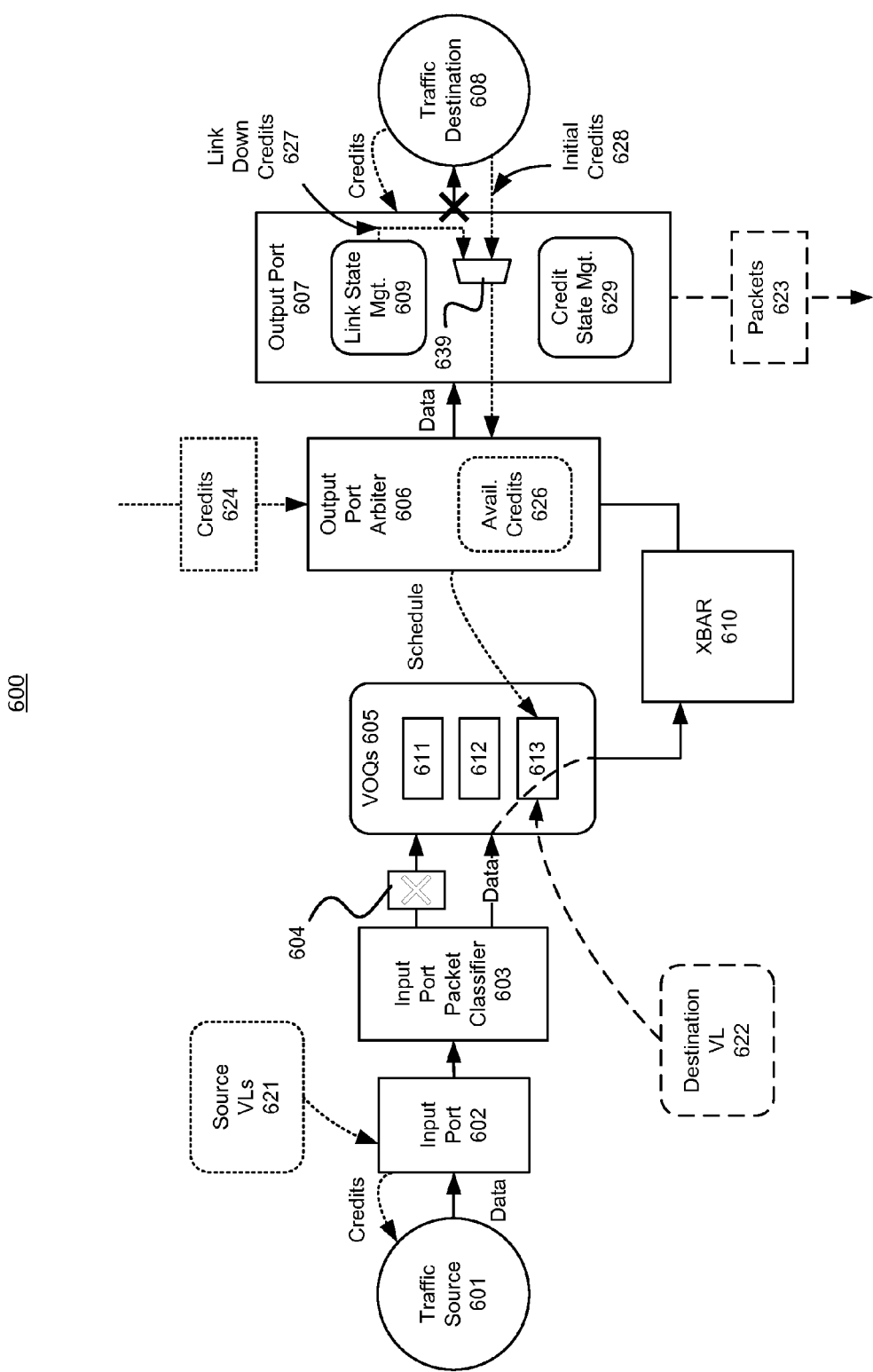
FIG. 6 shows an illustration of managing credit for handling a link state change in a network environment, in accordance with an embodiment of the invention.

FIG. 6 shows an illustration of managing credit for handling a link state change in a network environment, in accordance with an embodiment of the invention. As shown in FIG. 6, in a high performance system 600, a data flow in an IB network switch can involve an input port 602 and an output port 607, via a crossbar (XBAR) fabric 610.

The input port 602 can advertise one or more credits to and receives one or more data packets from a remote sender, such as the traffic source 601. The output port 607 can send one or more data packets to and receives one or more credits back from a remote receiver, such as the traffic destination 608.

Additionally, the input port 602 can take advantage of an input port packet classifier 603, which can determine one or more destinations for each incoming packet (and can use a port filter 604 to remove one or more packets). On per input port basis, the packets can be stored in an ingress buffer, such as the virtual output queues (VOQs) 605, before being transmitted to the destination.

As shown in FIG. 6, the ingress buffer, such as the virtual output queues (VOQs) 605, can include a plurality of queues 611-613. For example, the queue 613 can store the packets that are targeting the destination VL 622 on the output port 607.

In accordance with an embodiment of the invention, an output scheduler, such as an output port arbiter 606, can schedule the delivery of various packets from the different VOQs (including the queues other than the plurality of queues 611-613) toward the output port 607.

Furthermore, the output port arbiter 606 can select an input port from the different input ports on a network switch and can select a destination VL for delivering one or more packets targeting the output port 607, based on various criteria (such as available credits 626).

In accordance with an embodiment of the invention, the system can provide a framework that can provide an abstraction to the scheduling layer within the various output port crossbar arbiters. The system can achieve the link state abstraction by presenting the available credits 626 to the output scheduler, so that the output scheduler can be agnostic to any physical link state changes.

As shown in FIG. 6, in order to maintain the credit consistency, the output port arbiter 606 can consider the available credits 626 in reaching its scheduling decisions. Additionally, the entire link related state management 609 can be performed within the physical output port 607. Also, the output port 607 can perform credit state management 629 independently.

In accordance with an embodiment of the invention, the system can provide an interface 639 on the output port 607 for indicating the maximum credit values to the output port arbiter 606. For example, the interface 639 can reside between the port logic and the output port arbiter 606.

When the output port arbiter 606 receives the initial credits 628, the output port arbiter 606 can lock the values for the initial credits 628 as the maximum credits that can be consumed (until the next time when a new set of initial values are presented).

Thus, the system can prevent various potential race conditions that are due to the asynchronous nature of the link state change and packet scheduling (e.g. the conditions may be caused by the inflight packets and the overflow of the credits when they are returned).

For example, when the link is up (or active) with the traffic moving, all updates on the initial credits 628 can be presented to the output port arbiter 606 based on the values coming from the remote destination 608. For example, these values can simply pass through the interface 639. Then, the output port arbiter 606 can derive the values of the available credits 626 based on the information provided by the remote destination 608.

As shown in FIG. 6, when the link between the output port 607 and the remote traffic destination 608 is active (i.e. when the output port 607 is up), the output port arbiter 606 can schedule the input port 602 to deliver one or more packets, which are stored in the queue 613, to the selected destination VL 622 on the output port 607.

Then, the remote traffic destination 608 can release the credits back to the output port 607, as the outgoing packets (or data) are drained. Additionally, the output port arbiter 606 can use the released credit to schedule the queue 613 to deliver more packets to the selected destination VL 622 on the output port 607, through the XBAR fabric 610.

In accordance with an embodiment of the invention, using the IB protocol, the movement of the packets can be based on the availability of credits, a lack of which can block the packet movement in the VOQs in the IB network switch. Furthermore, the block behavior of the VOQs may result in unnecessary high (or even wasteful) utilization of the VOQs resources, depending on the traffic flow from a source (or input port) to a destination (or output port).

For example, if the link between the output port 607 and the remote traffic destination 608 becomes inactive (i.e. when the output port 607 is down), the release of the credits from the remote traffic destination 608 may stop as well (i.e. the current value of the available credits can be in any state). It is possible that there are no credits (or very few credits) available, in which case the packets that are enqueued in the VOQs 605 may not be able to move out of the VOQs 605, due to the lack of available credits.

As shown in FIG. 6, when the link on output port 607 goes down, the interface 639 can be used to maintain the abstraction. The link state management 609 (state machine) on the output port 607 can advertise a new set of initial credits (e.g. link down credits 627), in the same (or similar) manner as the initial credits 628 that are advertised when the link is up.

In accordance with an embodiment of the invention, the system can ensure that the values, which are advertised for the link down credits 627, can be sufficiently large. For example, the values can be estimated based on the turn-around time at the output port 607. Then, the output port arbiter 606 can lock on to the link down credits 627 as the new maximum number.

With the new credits available, the VOQs 605 can start sending packets (or data) towards the output port 607. As the data moving towards the physical output port 607, the packets 623 can be dropped and the credits 624 can be returned to the output port arbiter 606. This ensures that the output port arbiter 606 can consistently have available credits, in order to prevent the blocking behavior (even when the output port is down).

Furthermore, when the link come back up again, the credit flow follows the same process as advertising in the new initial credits 628, which allows the continuing traffic movement.

In accordance with an embodiment of the invention, the system can manage the flow of credits in order to avoid various deadlock scenarios under different conditions. For example, a deadlock can occur when the VOQs 605 are filled with packets for an output port, which may eventually cause a backup on the source VLs 621. Also, a deadlock may occur when multicast packets are involved. For example, when the ports that are ahead in the replication order list go down, the ports may start to block ports that are still active, since multicast packet may not be able to gain forward progress as they get replicated one by one.

Thus, the system can avoid the blocking behavior (or even deadlocks) by draining the packets in the VOQs 605. Also, the system can provide non-blocking behavior between output ports that are active while other ports are going through transitions.

Figure 7:
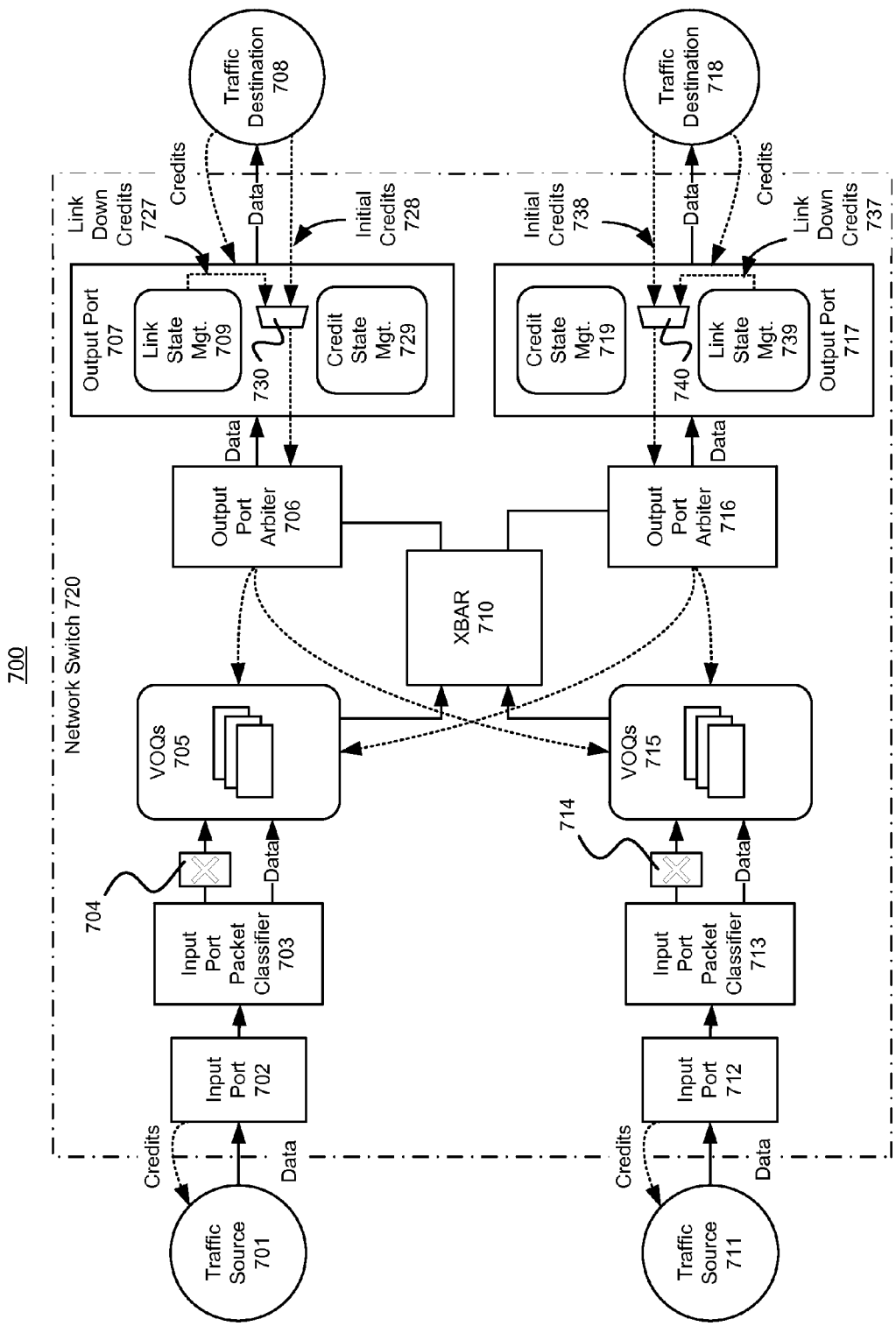
FIG. 7 shows an illustration of supporting credit management in a network switch, in accordance with an embodiment of the invention.

FIG. 7 shows an illustration of supporting credit management in a network switch, in accordance with an embodiment of the invention. As shown in FIG. 7, a network device, such as an IB network switch 720, can be responsible for directing traffic from various remote senders, such as the traffic sources 701 and 711, to various remote receivers, such as the traffic destinations 708 and 718, in a high performance system 700.

Furthermore, the IB network switch 720, which is based on a crossbar (XBAR) fabric 710, can support a large number of ports (with multiple VLs), such as the input ports 702 and 712 and the output ports 707 and 717.

Each of the input ports 702 or 712 can advertise one or more credits to and receives one or more data packets from the traffic source 701 or 711. Each of the output port 707 or 717 can send one or more data packets to and receives one or more credits back from the traffic destination 708 or 718.

Additionally, each of the input ports 702 and 712 can take advantage of an input port packet classifier 703 or 713, which can determine one or more output ports for each incoming packet (and can use a port filter 704 or 714 to remove one or more packets). On per input port basis, the packets can be stored in an ingress buffer, such as the virtual output queues (VOQs) 705 or 715, before being transmitted to a traffic destination 708 or 718 (via the output port 707 or 717).

In accordance with an embodiment of the invention, different output scheduler, such as the output port arbiters 706 and 716, can schedule the delivery of various packets from the different VOQs 705 and 715 toward the output port 707 and 717. Also, the system can manage the flow of credits in order to avoid various deadlock scenarios under different conditions.

As shown in FIG. 7, the output port 707 or 717 can perform credit state management 729 or 739. Additionally, the system can provide an interface 730 or 740 on the output port 707 or 717 for indicating the maximum credit values to the output XBAR arbiter 706 or 716. When the initial credits 728 or 738 are presented to the arbiter 706 or 716, the arbiter 706 or 716 can lock the values of the initial credits 728 or 738 as the maximum credits that can be consumed (until the next time when a new set of initial values are presented).

When the link is up (or active) with the traffic moving, all updates on the initial credits 728 or 738 can be presented to the output port arbiter 706 or 716 based on the values coming from the remote destination 708 or 718.

On the other hand, when the link goes down, the current value of the maximum credits allowed can be in any state. It is possible that there are no credits (or very few credits) available.

As shown in FIG. 7, when the link on the output port 707 or 717 goes down, the interface 730 or 740 can be used to maintain the abstraction. The link state management 709 or 719 (state machine) on the output port 707 or 717 can advertise a new set of initial credits (e.g. the link down credits 727 or 737), in the same (or similar) manner as the initial credits 728 or 738 that are advertised when the link is up.

Then, the VOQs 705 and 715 can start sending packets (or data) towards the output ports 707 or 717. As the data moving towards the physical output port 707 or 717, the packets can be dropped and the credits can be returned to the output port arbiter 706 or 716. This ensures that the arbiter 706 or 716 can constantly have available credits, even when the output port is down, which prevents the blocking behavior.

Thus, by draining the packets, which are in the VOQ 705 and 715, the system can avoid the blocking behavior in the VOQs 705 and 715 and among other output ports (or even deadlocks).

Furthermore, when the link come back up again, the credit flow can follow the same process as advertising the new initial credits 728 or 738, which allows the continuing traffic movement.

Figure 8:
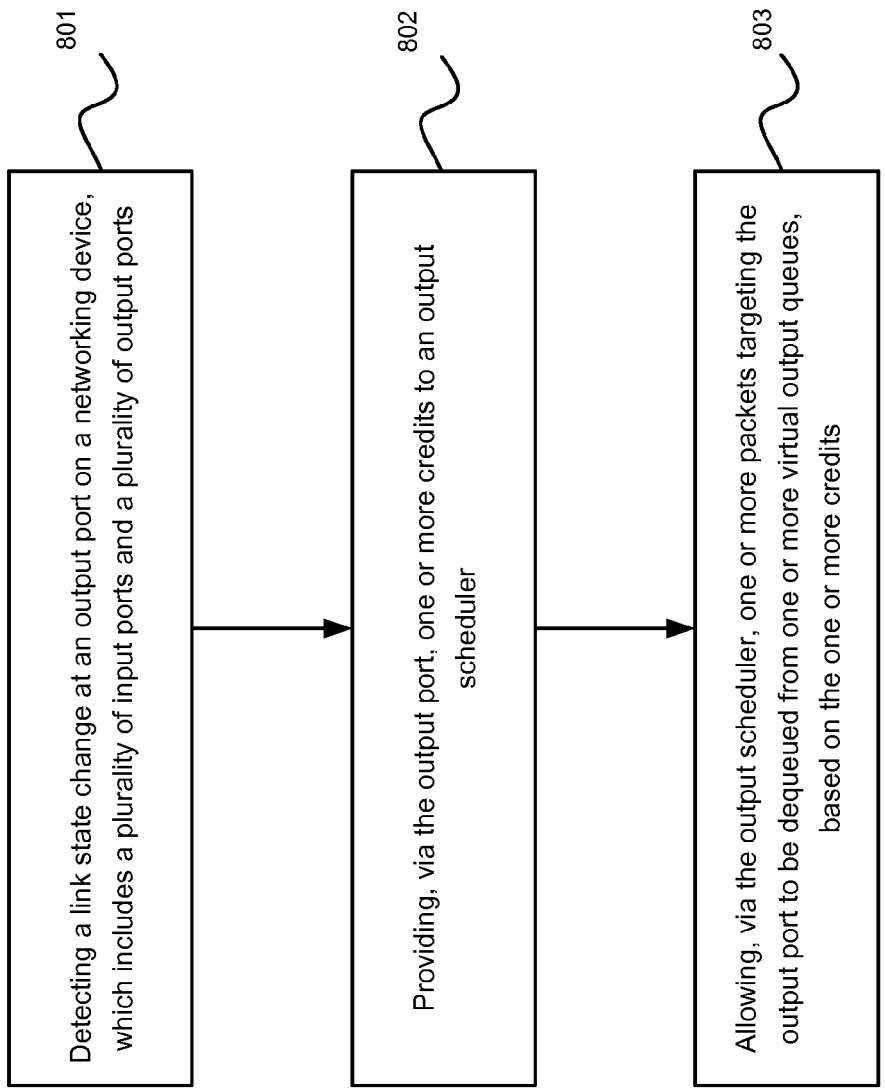
FIG. 8 illustrates an exemplary flow chart for supporting credit management in a network switch, in accordance with an embodiment of the invention.

FIG. 8 illustrates an exemplary flow chart for supporting credit management in a network switch, in accordance with an embodiment of the invention. As shown in FIG. 8, at step 801, the system can detect a link state change at an output port on a networking device, which includes a plurality of input ports and a plurality of output ports. Furthermore, at step 802, the output port can provide one or more credits to an output scheduler. Then, at step 803, the output scheduler allows one or more packets targeting the output port to be dequeued from one or more virtual output queues, based on the one or more credits.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting packet switching in a network device having a shared memory, plurality of input ports, and a plurality of output ports, the method comprising:
    providing an ingress buffer on the network device;
    maintaining a plurality of virtual output queues (VOQs) in the ingress buffer, wherein each VOQ comprises resources of the shared memory;
    maintaining with an output scheduler, a credit state for each of the plurality of VOQs, the output scheduler being configured to schedule delivery of packets from the plurality of VOQs to the plurality of output ports based on a relation between the credit state for each of the plurality of VOQs and credits selectively released to the output scheduler from the output ports;
    detecting a link state change at a first output port of the plurality of output ports;
    providing, via the first output port, one or more link-down credits to the output scheduler; and
    dequeuing from the VOQs by the output scheduler, one or more packets targeting the first output port based on a relation between the one or more link-down credits and the credit state for the plurality of VOQs.

2. The method according to claim 1, wherein the network device is a network switch, which includes a crossbar fabric.

3. The method according to claim 1, further comprising: storing, via one or more input ports of said plurality of input ports, said one or more packets into said one or more said virtual output queues.

4. The method according to claim 1, further comprising: dequeuing the one or more packets targeting the output port from the one or more virtual output queues based on the one or more link-down credits.

5. The method according to claim 1, further comprising: providing, via the output port, one or more link-down credits to the output scheduler in order to prevent blocking behavior and deadlocks in the network device.

6. The method according to claim 1, further comprising: setting, via the output scheduler, the one or more credits to be maximum credits available.

7. The method according to claim 6, further comprising: deriving, via the output scheduler, available credits based on the maximum credits available.

8. The method according to claim 7, further comprising: allowing selecting a destination VL based on the credit state for each of the plurality of VOQs.

9. The method according to claim 8, further comprising: forwarding said one or more packets from the virtual output queue toward the selected destination VL.

10. The method according to claim 9, further comprising: draining said one or more packets at the output port, and returning one or more credits to one or more source VLs on an input port.

11. A system for supporting packet switching in a network environment, comprising:
    a networking device comprising a microprocessor, a shared memory, a plurality of input ports, and a plurality of output ports, wherein the networking device is configured to:
        provide an ingress buffer on the networking device;
        maintain a plurality of virtual output queues (VOQs) in the ingress buffer, wherein each VOQ comprises resources of the shared memory;
        maintain with an output scheduler, a credit state for each of the plurality of VOQs, the output scheduler being configured to schedule delivery of packets from the plurality of VOQs to the plurality of output ports based on a relation between the credit state for each of the plurality of VOQs and credits selectively released to the output scheduler from the output ports;
        detect a link state change at a first output port of the plurality of output ports;
        provide one or more link-down credits to the output scheduler in response to detecting the a link state change at the first output port; and
        dequeuing, from the VOQs by the output scheduler, one or more packets targeting the first output port based on a relation between the one or more link-down credits and the credit state for the plurality of VOQs.

12. The system according to claim 11, wherein:
the networking device is a network switch with a crossbar fabric.

13. The system according to claim 11, wherein:
one or more input ports of said plurality of input ports operate to store said one or more packets into said one or more said virtual output queues.

14. The system according to claim 11, wherein:
the networking device is configured to dequeue the one or more packets targeting the output port from the one or more virtual output queues based on the one or more link-down credits.

15. The system according to claim 11, wherein:
providing said one or more link-down credits to the output scheduler prevents blocking behavior and deadlocks in the networking device.

16. The system according to claim 11, wherein:
the output scheduler operates to set the one or more credits to be maximum credits available.

17. The system according to claim 16, wherein:
the output scheduler operates to derive available credits based on the maximum credits available.

18. The system according to claim 17, wherein:
the output scheduler operates to select a destination VL based on the available credits.

19. The system according to claim 18, wherein:
the networking device operates to:
forward said one or more packets from the virtual output queue toward the destination VL on the output port,
drain said one or more packets at the output port, and
return one or more credits to one or more source VLs on an input port.

20. A non-transitory machine readable storage medium having instructions stored thereon for supporting packet switching in a network device having a shared memory and a plurality of input ports and a plurality of output ports, which instructions, when executed cause the network device to perform steps comprising:
providing an ingress buffer on the network device;
maintaining a plurality of virtual output queues (VOQs) in the ingress buffer, wherein each VOQ comprises resources of the shared memory;
maintaining with an output scheduler, a credit state for each of the plurality of VOQs, the output scheduler being configured to schedule delivery of packets from the plurality of VOQs to the plurality of output ports based on a relation between the credit state for each of the plurality of VOQs and credits selectively released to the output scheduler from the output ports;
detecting a link state change at a first output port of the plurality of output ports;
providing, via the first output port, one or more link-down credits to the output scheduler; and
dequeuing from the VOQs by the output scheduler, one or more packets targeting the first output port to be dequeued from said VOQs based on a relation between the one or more link-down credits and the credit state for the plurality of VOQs.

* * * * *

UNITED STATES PATENT AND TRADEMARK OFFICE
CERTIFICATE OF CORRECTION

PATENT NO. : 9,838,330 B2  
APPLICATION NO. : 14/584824  
DATED : December 5, 2017  
INVENTOR(S) : Srinivasan et al.

Page 1 of 1

It is certified that error appears in the above-identified patent and that said Letters Patent is hereby corrected as shown below:

In the Claims

In Column 11, Line 30, in Claim 1, before "plurality" insert -- a --.

In Column 12, Line 5, in Claim 8, before "selecting" delete "allowing".

In Column 12, Line 36, in Claim 11, after "detecting the" delete "a".

In Column 14, Line 13-14, in Claim 20, after "port" delete "to be dequeued from said VOQs".

Signed and Sealed this  
Second Day of July, 2019

Andrei Iancu  
*Director of the United States Patent and Trademark Office*